United States Patent [19]

Koester et al.

[11] 4,050,962

[45] Sept. 27, 1977

[54] MANUFACTURE OF FERROMAGNETIC, ACICULAR METALLIC IRON PARTICLES BY HYDROGEN REDUCTION

[75] Inventors: Eberhard Koester, Frankenthal; Gerd Wunsch, Speyer; Eduard Schoenafinger, Ludwigshafen; Henning Schneehage, Mutterstadt, all of Germany

[73] Assignee: BASF Aktiengesellschaft, Ludwigshafen, Germany

[21] Appl. No.: 595,562

[22] Filed: July 14, 1975

[30] Foreign Application Priority Data

July 16, 1974 Germany .............................. 2434096

[51] Int. Cl.² .............................................. H01F 1/02
[52] U.S. Cl. .................................. 148/105; 75/.5 BA; 252/62.55; 252/62.63; 427/127
[58] Field of Search ......... 148/105; 75/.5 BA, .5 AA; 252/62.55, 62.56, 62.63; 427/127, 128, 132; 428/432, 433

[56] References Cited

U.S. PATENT DOCUMENTS

| | | | |
|---|---|---|---|
| 3,206,338 | 9/1965 | Miller et al. | 148/105 |
| 3,369,886 | 2/1968 | Metzger et al. | 75/.5 AA |
| 3,661,556 | 5/1972 | Jolley et al. | 75/.5 AA |
| 3,702,270 | 11/1972 | Kawasaki et al. | 148/105 |
| 3,748,119 | 7/1973 | Hwang et al. | 75/.5 AA |
| 3,837,839 | 9/1974 | Rau et al. | 75/.5 BA |
| 3,903,004 | 9/1975 | Matsumoto et al. | 252/62.63 |
| 3,912,646 | 10/1975 | Leitner et al. | 252/62.63 |
| 3,967,986 | 7/1976 | Rau et al. | 148/105 |

*Primary Examiner*—Walter R. Satterfield
*Attorney, Agent, or Firm*—Keil, Thompson & Shurtleff

[57] ABSTRACT

A process for the manufacture of acicular ferromagnetic metal pigments containing iron, having a reduced field strength distribution and a steeper residual magnetization curve, by applying equivalent amounts of an alkaline earth metal cation and of a monobasic, dibasic or tribasic aliphatic carboxylic acid of up to 6 carbon atoms onto appropriate acicular iron oxides and then reducing the treated oxides.

8 Claims, No Drawings

MANUFACTURE OF FERROMAGNETIC, ACICULAR METALLIC IRON PARTICLES BY HYDROGEN REDUCTION

The invention relates to a process for the manufacture of acicular ferromagnetic metal pigments containing iron, having a reduced field strength distribution and a steeper residual magnetization curve.

Because of their high saturation induction and the high coercive force achieved, ferromagnetic metal powders and thin layers of metals are of particular interest for the manufacture of magnetic recording media. This is related to the fact that they permit a substantial increase in the energy product and information density which means, inter alia, that compared to present-day standards, such a recording medium can give narrower signal widths and better signal amplitudes. Thin layers of metals have the further advantage over pigments that the binder constituent normally required can be omitted and the ideal filling factor of 1.0 can be achieved. However, the said metal layers are expensive to manufacture and in particular their use as a recording tape presents problems due to the mechanics of the recorder. Whilst the optimum layer thickness is about $1/\mu$ or less, the surface of the layer must be very smooth because of the head/tape contact, and under these circumstances the minutest amount of abrasion or even dust can be destructive.

It is true that when using metal powders as magnetic pigments, the mechanical properties of the recording medium can be varied within wide limits by appropriate choice of the binder systems, but the shape, size and dispersibility of the metal pigments have to conform to special requirements.

Since a high coercive strength and high residual magnetization are essential conditions for magnetic pigments used in layers acting as magnetic stores, the suitable magnetic pigments must display the behavior of a magnetic single domain and furthermore external factors, eg. temperature of mechanical forces, should have little influence on the existing anisotropy or the anisotropy additionally achievable by magnetic orientation in the tape, ie. the small particles should be dimensionally anisotropic, preferably acicular, and should in general be of from $10^2$ and $10^4$ A in size.

It has been disclosed that this type of dimensionally anisotropic ferromagnetic metal particles may be produced by metal deposition at a mercury cathode (J. Electrochem. Soc., 10 S (1961), p. 113 S). The precautions which this process requires are considerable and correspondingly expensive. The reduction of, eg. iron salts by means of hydrides, (J. Appl. Phys., 32 (1961), p. 184 S) and the vacuum vaporization of the metals and subsequent deposition as whiskers (J. Appl. Phys., 34 (1963), p. 2,905) have also been disclosed but are not of industrial utility. It is also known to manufacture metal powders of the above type by reduction of particulate acicular metal compounds, eg. oxides, with hydrogen or other gaseous reducing agents. If the reduction is to take place at a rate which is industrially utilizable, it must be carried out at above 350° C. This however entails the difficulty that the resulting metal particles sinter. As a result, the particle shape no longer corresponds to that required from the point of view of the magnetic properties. In order to lower the reduction temperature it has already been proposed to catalye the reduction by appling silver or silver compounds to the surface of particulate iron oxide (German Published Application 2,014,500).

The catalytic acceleration, by noble metals, of the reduction of preferentially acicular starting compounds in general, however, gives far smaller needles than those of the starting product, and furthermore their length: thickness ratio is low. As a result, the end product has a rather broad particle size spectrum and hence a broad distribution of dimensional anisotropy. However, the literature discloses that the dependence of the coercive force and residual magnetization on the particle size of magnetic materials is very marked at the order of magnitude of single-domain particles (Kneller, Ferromagnetismus, Springer-Verlag 1962, p. 437 et seq.). If additional factors enter the picture attributable to a proportion of super-paramagnetic particles which may be produced as fragments when using the above process, then such magnetic pigments are highly unsuitable for use in the manufacture of magnetic recording media, eg. because of their poor maximum output level. With such heterogenous mixture, the magnetic field strength required for magnetic reversal of the particles varies greatly and the distribution of the residual magnetization as a function of the applied external field also gives a curve of low slope.

It is an object of the present invention to provide a process for the manufacture of acicular ferromagentic metal pigments containing iron, such that the metal pigments obtained by reduction exhibit a narrow field strength distribution and a steep residual magnetization curve.

We have found that magnetic pigments which are acicular and ferromagnetic and predominantly contain iron can be manufactured by reduction of the acicular iron oxides with hydrogen at up to 400° C, so as to retain the predominantly acicular shape, by a process wherein, prior to the reduction, there are applied to the acicular iron oxides equivalent amounts of an alkaline earth metal cation and of a monobasic, dibasic or tribasic aliphatic carboxylic acid of up to 6 carbon atoms.

Carboxylic acids, for the purposes of the present invention, are saturated or unsaturated aliphatic carboxylic acids of up to 6 carbon atoms and with up to 3 acid groups, in which carboxylic acids one or more hydrogen atoms of the aliphatic chain may be substituted by hydroxyl or amino radicals. Hydroxydicarboxylic acids and hydroxytricarboxylic acids, such as tartaric acid or citric acid, are particularly suitable.

Iron oxides which may be used according to the invention are the acicular iron oxides from amongst $\alpha$-FeOOH, $Fe_3O_4$, $Fe_2O_3$ and $\gamma Fe_2O_3$, and the same iron oxides modified with cobalt and/or nickel. These oxides may also be used for the manufacture of ferromagnetic metal pigments if they contain other elements, provided that the incorporation of other foreign elements does not disturb the acicular form. Particularly preferred ferromagnetic metal pigments contain iron and up to 25 atom percent of cobalt.

The alkaline earth metal cation applied simultaneously with the carboxylic acid to the iron oxide is chosen from amongst calcium, barium and strontium.

The acicular oxide particles are preferably treated by dispersing them, together with a soluble alkaline earth metal compound and the carboxylic acid in a solvent which is suitable for the compounds to be applied to the metal oxide and which is easily removed subsequently. Water or alcohols may be used with advantage. In another embodiment of the process of the invention, an alkaline earth metal salt of the carboxylic acid is first formed and is then applied in solution to the oxide, after which the solvent is evaporated off.

According to the process of the invention, the acicular oxide treated in this way is reduced to the metal by coventional methods, by passing a gaseous reducing agent, preferably hydrogen, at up to 400° C, preferably at from 230° to 350° C, over the oxide material. According to the state of the art, satisfactory rates of reduction and satisfactory degrees of reduction were not achievable with untreated metal oxides at reduction temperatures below 400° C, if sintering of the resulting metal particles was to be avoided. It is true that surface modification with noble metals gave a higher rate of reaction and a higher coercive force, but the other magnetic values and pigment properties did not conform to the high standards which magnetic pigments for magnetic recording media must meet.

The magnetic values of the powders were measured with a vibrating sample magnetometer at a magnetic field of 800 kA/m.

In addition to a high coercive force Hc and a high residual induction, the so-called remanence coercivity $H_R$ is an important parameter in assessing the powder. In d.c. demagnetization, half — based on volume — of the particles have had their magnetization reversed at field strength $H_R$. Accordingly, $H_R$ is a characteristic parameter for recording processes which, in particular, determines the bias setting for magnetic recording. The more heterogeneous is the remanence coercivity of the individual magnetic particles in the recording layer, the broader is the distribution of the magnetic fields which can reverse the magnetization of a defined volume of the recording layer. This plays a role particularly if, because of high recording densities or low wavelengths, the boundary zone between magnetic domains of opposite magnetization should be as narrow as possible. To characterize the distribution of the reversal field strengths of the individual particles, a value $h_5$ for the total width of the residual induction curve and $h_{25}$ for the slope of the residual induction curve is determined from the d.c. field demagnetization curve. These values are determined from the equations $$h_5 = (H_{95} - H_5)/H_R$$

and $$h_{25} = (H_{75} - H_{25})/H_R$$

The subscript of the letter H indicates what percentages of the particles have had their magnetization reversed.

Typical values of $h_5/h_{25}$ are 1.5/0.6 for gamma-iron-(III) oxide and powders and chromium dioxide powders and 1.0/0.3 for the magnetic tapes obtained with these powders. Magnetic metal pigments of the art, and magnetic tapes produced therewith, exhibit higher values, of about from 1.8 to 2.0/0.6, which thus indicate a broader distribution of the field strengths. As expected, magnetic thin layers of metals exhibit a particularly narrow distribution, with values of about 0.5/0.1

On treating the acicular iron oxides in accordance with the invention with from 0.2 to 10 percent by weight, preferably from 2 to 8 percent by weight, based on the iron oxide employed, of the alkaline earth metal cation and of the carboxylic acid, the metal pigments obtained after reduction exhibit particularly low $h_5/h_{25}$ values.

After the reduction, which is practically complete even at temperature below 300° C, it is found that there has only been an insignificant change in the acicular form of the initial oxides. Examples of products of the process of the invention are iron needles of from 0.1 to 0.6μ in length, with a length:thickness ratio of from 10 to 25:1.

The $h_5/h_{25}$ values of metal pigments manufactured according to the invention are from 1.6/0.5 to 1.46/0.50. Such magnetic metal powders, in spite of having been manufactured by reduction of oxide powders, give acicular particles of consistently well-developed structure, which in addition to the advantageous magnetic properties of dimensionally anisotropic ferromagnetic small particles exhibit the narrow field stength distribution required for use of the particles in magnetic recording media for high recording densities and frequencies.

The process of the invention has proved to be particularly advantageous in the case of iron oxides modified with cobalt or nickel. If is known that it is particularly these acicular oxides which lose their external form on reduction to the metal. This disadvantage no longer manifests itself when the process of the invention is used. Because of the particularly favorable magnetization values of iron-cobalt particles, this is a further advantage of the present invention.

The experiments which follow illustrate the process of the invention and show, by comparative experiments, the technical innovation achieved. For easier appreciation, the acicular shape and magnetic values are tabulated. The metal particles obtained after reduction were pyrophoric and had to be passivated by conventional processes before they were used further.

EXAMPLE 1

100 g of α-FeOOH needles of length 0.5/μ and 30:1 length: thickness ratio are dispersed in 2 liters of methanol. 2.9 g of barium acetate, dissolved in 30 ccs of water, are added. After evaporating off the solvent, the oxide power is dried at 100° C under reduced pressure. Reduction with hydrogen at 300° C for 8 hours gives an acicular iron powder.

EXAMPLE 2

The procedure followed is as in Example 1 except that 5.7 g of barium acetate dissolved in 60 ccs of water are added.

EXAMPLE 3

100 of α-FeOOH of Examle 1 are dispersed in 2 liters of methanol and 3.6 of barium hydroxide octahydrate dissolved in 300 ccs of water are added. 2.9 g of oxalic acid dissolved in 100 ccs of water are then introduced. After evaporating off the solvent, the oxide powder is dried at 100° C under reduced pressure. Reduction with hydrogen at 275° C for 8 hours gives an acicular iron powder.

EXAMPLE 4

The procedure followed is as in Example 3 except that 3.4 g of tartaric acid, dissolved in 20 ccs of water, are added.

EXAMPLE 5

The procedure followed is as in Example 3 except that 4.5 g of citric acid, dissolved in 20 ccs of ethanol, are added.

EXAMPLE 6

The procedure followed is as in Example 3 except that 5.2 g of maleic acid dissolved in 20 ccs of ethanol are added.

EXAMPLE 7

100 g of α-FeOOH of Example 1 are dispersed in 1.5 l of water in which 6 g of cobalt chloride hexahydrate have been dissolved. Cobalt hydroxide is precipitated on the surface of the α-FeOOH by adding dilute ammonia solution until the pH is 10, and the pigment is then dried. 100 g of the α-FeOOH, containing 1.5% of CO, are dispersed in 2 liters of methanol and 3.6 g of barium hydroxide octahydrate dissolved in 300 ccs of water are added. 2.9 g of oxalic acid dissolved in 100 ccs of water are then introduced. After evaporating off the solvent, the oxide power is dried at 100° C under reduced pressure. Reduction at 300° C for 8 hours gives an acicular iron pigment containing cobalt.

COMPARATIVE EXPERIMENT 1

100 g of α-FeOOH of Example 1 are dispersed in 2,000 ccs of methanol. After evaporating off the methanol, the dried powder is reduced for 8 hours at 275° C with 200 l of hydrogen per hour.

COMPARATIVE EXPERIMENT 2

100 g of α-FeOOH of Example 1 are dispersed in 2,000 ccs of ethanol in which 0.38 g of silver nitrate are dissolved. After evaporating off the alcohol, the powder is dried. The reduction is carried out at 250° C with 200 l of hydrogen per hour and is complete after 8 hours.

COMPARATIVE EXPERIMENT 3

The procedure followed is as in Comparative Experiment 2 except that 0.40 g of palladium acetylacetonate are dissolved in the ethanol.

TABLE

| Experiment No. | Reduction temperature °C | Needle length, μ | Length:thickness ratio | Magnetic values at 800 kA/m | | |
|---|---|---|---|---|---|---|
| | | | | $H_c$ [kA/m] | $H_R$ | $h_s/h_{25}$ |
| Example 1 | 300 | 0.2 to 0.3 | 15 to 20:1 | 100 | 124 | 1.46/0.50 |
| Example 2 | 300 | 0.2 to 0.3 | 15 to 20:1 | 102 | 135 | 1.49/0.50 |
| Example 3 | 275 | 0.2 to 0.3 | 15 to 20:1 | 99 | 120 | 1.50/0.50 |
| Example 4 | 275 | 0.2 to 0.3 | 15 to 20:1 | 101 | 120 | 1.51/0.49 |
| Example 5 | 300 | 0.2 to 0.3 | 15 to 20:1 | 100 | 121 | 1.52/0.51 |
| Example 6 | 300 | 0.2 to 0.3 | 15 to 20:1 | 101 | 119 | 1.54/0.51 |
| Example 7 | 300 | 0.2 to 0.3 | 15:1 | 106 | 129 | 1.53/0.50 |
| Comparative experiment 1 | 275 | 0.1 to 0.2 | 5 to 8:1 | 90 | 122 | 1.85/0.62 |
| Comparative experiment 2 | 250 | 0.07 to 0.15 | 5 to 8:1 | 98 | 121 | 1.65/0.55 |
| Comparative experiment 3 | 250 | 0.05 to 0.13 | 5 to 8:1 | 97 | 119 | 1.65/0.55 |

We claim:

1. A process for the manufacture of acicular ferromagnetic iron metal particles which comprises the steps of:
   a. dispersing acicular iron oxide in a solution of an alkaline earth metal salt in a solvent wherein the alkaline earth metal cation of said metal salt is selected from the group consisting of calcium, barium and strontium, and the acid anion of said metal salt is selected from the group consisting of aliphatic monobasic, dibasic and tribasic carboxylic acid anions of from 2 to 6 carbon atoms;
   b. removing the solvent by evaporation, said alkaline earth metal salt being applied to said acicular iron oxide in an amount of from 0.2 to 10% by weight based on the iron oxide employed; and
   c. reducing the so-treated pulverulent acicular iron oxide by passing gaseous hydrogen at a temperature of from 230 to 350° C over said treated iron oxide to form acicular iron metal particles retaining the acicular shape of the acicular iron oxide starting material and being from 0.1 to 0.6 μm in length with a length-to-thickness ratio of from 10 to 25:1.

2. A process as set forth in claim 1 wherein the iron oxide is an acicular iron oxide containing cobalt or nickel.

3. A process as set forth in claim 1, wherein the iron oxide is an acicular hydrated α-iron oxide.

4. A process as set forth in claim 1, wherein the alkaline earth metal cation is barium.

5. A process as set forth in claim 1, wherein the aliphatic carboxylic acid anion is an anion of a hydroxydicarboxylic acid.

6. A process as set forth in claim 1 wherein said carboxylic acid anion is selected from the group consisting of anions of acetic acid, oxalic acid, tartaric acid, maleic acid and citric acid.

7. A process as set forth in claim 1 wherein the acicular iron oxide contains up to about 25 atom percent of cobalt.

8. A process as set forth in claim 1 wherein the amount of said salt applied onto the surface of said iron oxide is from 2 to 8 percent by weight and wherein said salt is formed by the reaction of equivalent amounts of barium and a carboxylic acid of 2 to 6 carbon atoms selected from the group consisting of hydroxydicarboxylic and hydroxytricarboxylic acids.

* * * * *